Patented Aug. 26, 1930

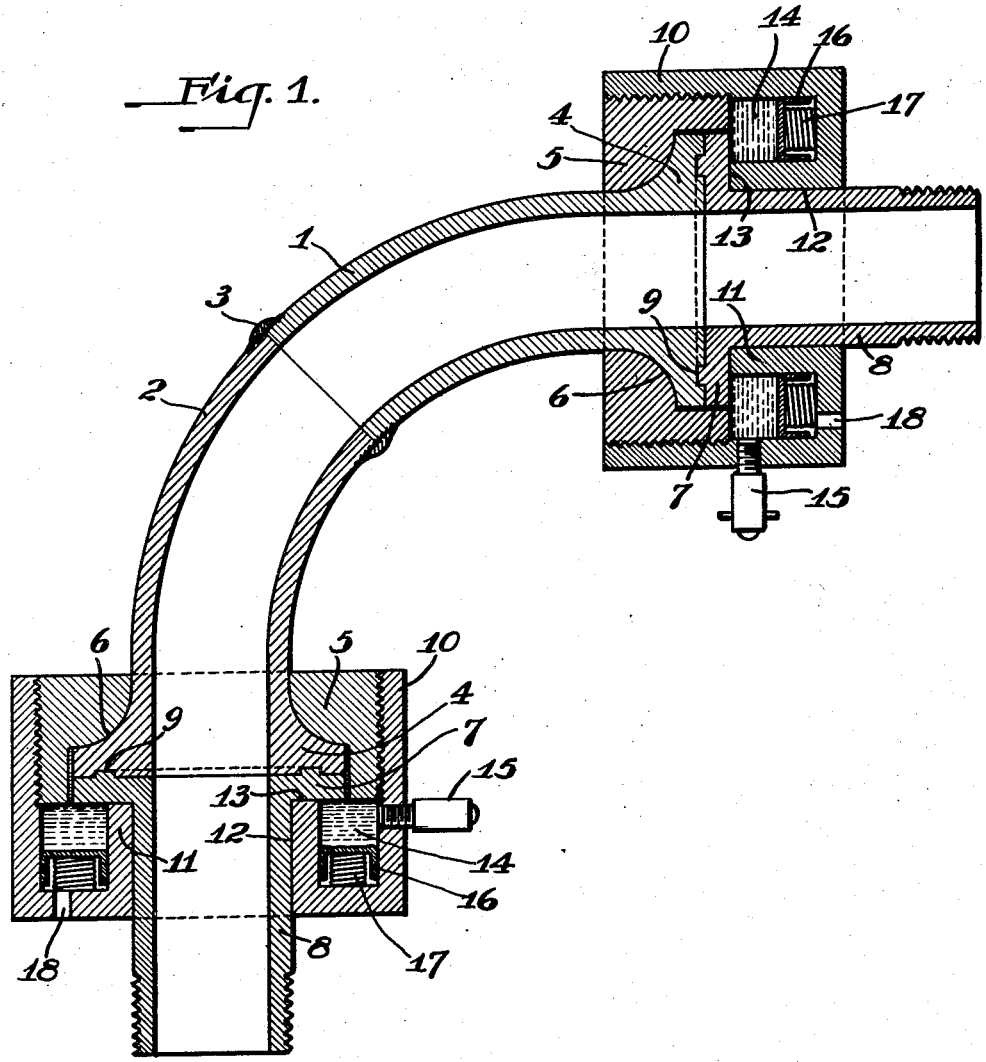

1,774,179

UNITED STATES PATENT OFFICE

HALBERT P. MacGREGOR, OF ST. LOUIS, MISSOURI

SWINGING PIPE JOINT

Application filed March 14, 1929. Serial No. 346,845.

The invention relates to pipe joints of the swinging type. The packing ordinarily used in pipe joints of this kind deteriorates in service, causing leaks, and requiring constant attention. It is the purpose of the present invention to overcome these difficulties and to provide a joint which keeps tight; which swings easily; which has a minimum of wear, and which is cheap to make. One embodiment of the invention is shown in the accompanying drawings, wherein:

The figure is a section through the construction involving two swinging joints at 90 degrees to each other so as to provide a universal connection.

Referring to the drawing, the 90 degree pipe elbow is made up of two parts 1 and 2 welded together, as indicated at 3 and provided with the flanges 4, 4. Fitting the pipe back of each flange is a collar 5 threaded exteriorly, such collars having concave convex engagements with flanges 4, 4, as indicated at 6. This allows the collars to shift their positions slightly without affecting the tightness and security of the contact between the surfaces.

In opposition to the flanges 4, 4 are the flanges 7, 7 of the pipe sections 8, 8, the opposing surfaces being suitably machined and preferably provided with the interengaging tongues and grooves 9, 9 as shown. Threaded onto the collars 5, 5 are the coupling or clamping collars 10, 10. The flanges 11, 11 of these sleeves engage the flanges 7, 7, and when the sleeves are screwed in, the flanges 4 and 7 are brought into close engagement although not in such tight contact as to prevent the free rotation of the sections 8, 8 with respect to the elbow sections 1 and 2. Suitable locking means (not shown) may be employed to prevent the unscrewing of the sleeves 10, 10 after they have been tightened to the proper degree. The surfaces of pipe sections 8, 8 and flanges 11, 11 are machined to an accurate working fit a 12, 12, and the contacting surfaces 13, 13 at the ends of the flanges 11, 11 are also accurately machined.

The sleeve construction provides oil reservoirs 14, 14 to which oil or other lubricant may be fed under pressure through suitable lubricating fittings 15, 15 provided with the usual check valves. Annular plungers 16, 16 are mounted in the reservoirs with the springs 17, 17 to the rear thereof, so that the lubricant is maintained under pressure until completely exhausted from the reservoirs. Ports 18, 18 provide for the escape from the sleeves of any lubricant which may leak past the plungers.

The lubricant, which is selected, depending on the service to be performed by the joint, acts as a packing between the relatively moving surfaces of the joints, and the parts may be adjusted so that they move easily without leakage, thus making the joint easy to swing and reducing the wear on the moving parts. The joint will remain tight as long as the supply of lubricant is maintained.

In assembling, the collars 5, 5 are slipped over the sections 1 and 2 before they are welded together. The plungers 16, 16 now being placed in the sleeves 10, 10, these parts are slipped over the pipe sections 8, 8 and such sections positioned as shown. The sleeves are then screwed onto the collars 5, 5 to clamp the pipe sections to the elbow 1, 2 and the oil reservoirs are charged through the fittings 15, 15, thus placing the connection in condition for service. In operation, the swiveling or turning at the joint may occur between the parts 4 and 5 or between 10 and 8, or in part at the one place and part at the other.

What I claim is:

1. In combination in a pipe joint, a pipe section provided at its end with a flange, a collar fitting around the end of the section back of the flange, a coupling sleeve threaded onto the collar, a pipe section swivelled in said sleeve, an oil reservoir in said sleeve, and spring pressed means in the sleeve applying pressure to the oil in said reservoir and tending to feed it between the opposing surfaces of the joint which move relatively.

2. In combination in a pipe joint, a pipe section provided at its end with a flange, a collar fitting around the end of the section back of the flange, a coupling sleeve threaded onto the collar, a pipe section swivelled in said sleeve, an oil reservoir in said sleeve, and a spring pressed plunger in the sleeve tending to feed the oil in said reservoir between the opposing surfaces of the joint which move relatively, said sleeve being provided with an escape port through its wall to the rear of said plunger.

3. In combination in a pipe joint, a pipe section provided at its end with a flange, a collar fitting around the end of the section back of the flange, a second pipe section having its end flanged and in engagement with the flange at the end of the first pipe section, a coupling sleeve closely fitting the second pipe section with its end in engagement with the flange thereof and threaded onto said collar, an oil reservoir in said sleeve, and spring means in the sleeve applying pressure to the oil tending to force it between the relatively moving surfaces of the joint.

In testimony whereof, I have hereunto subscribed my name this 11th day of March, 1929.

HALBERT P. MacGREGOR.